United States Patent [19]

Harvey

[11] Patent Number: 5,222,277

[45] Date of Patent: Jun. 29, 1993

[54] INTERMITTENTLY AND REVERSIBLY OPERABLE HOT WAX ENERGIZED HINGE

[75] Inventor: T. Jeffrey Harvey, Lompoc, Calif.

[73] Assignee: AEC-Able Engineering Co., Inc., Goleta, Calif.

[21] Appl. No.: 860,788

[22] Filed: Mar. 31, 1992

[51] Int. Cl.[5] .............................................. E05F 15/20
[52] U.S. Cl. ...................................... 16/48.5; 16/52; 16/53; 188/268; 188/274
[58] Field of Search ...................... 188/266, 268, 274; 16/51, 52, 53, 60, 235, 239, 242, 357, 360, 48.5

[56] References Cited

U.S. PATENT DOCUMENTS

| | | | |
|---|---|---|---|
| 2,027,170 | 1/1936 | Hemingway | 16/53 |
| 2,158,417 | 5/1939 | Garrison | 16/53 |
| 4,267,619 | 5/1981 | Suska | 16/52 |
| 4,483,043 | 12/1984 | Tillman | 16/48.5 |
| 4,842,106 | 6/1989 | Ludwig et al. | 16/48.5 |

Primary Examiner—W. Donald Bray
Attorney, Agent, or Firm—Donald D. Mon

[57] ABSTRACT

A powered hinge powered by a hot wax linear actuator, which can provide for bi-directional rotation of the hinge as the consequence of sequential and intermittent energizing and deenergizing sequence of the actuator.

9 Claims, 3 Drawing Sheets

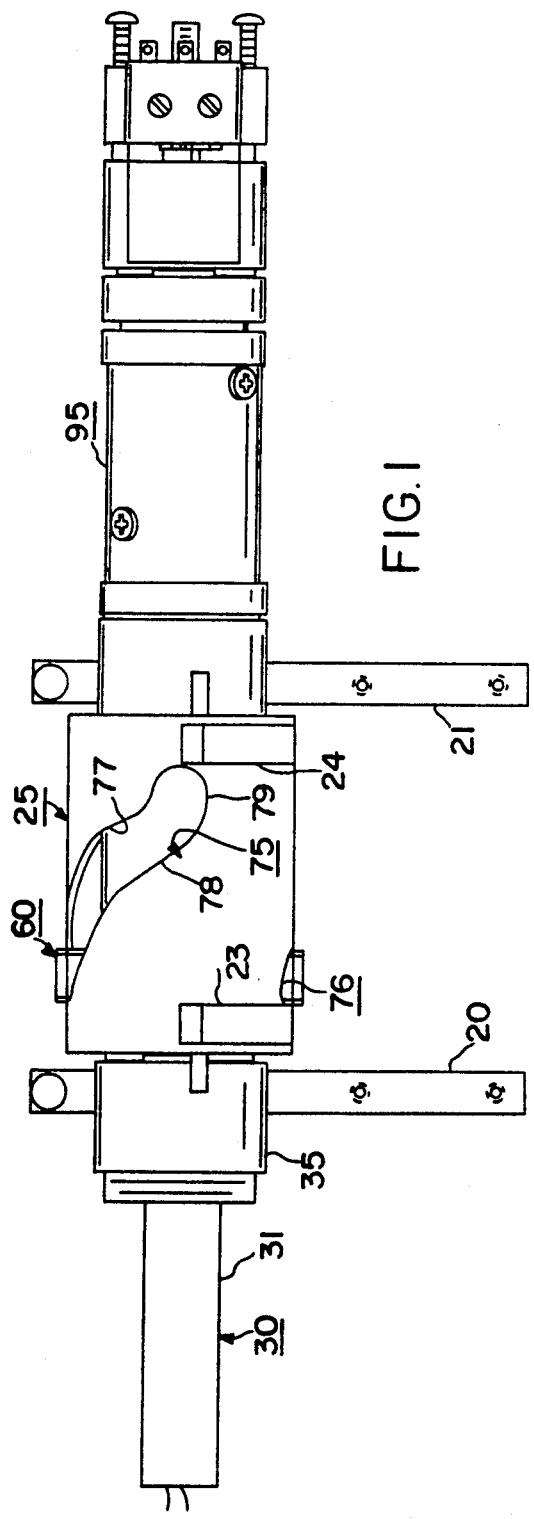
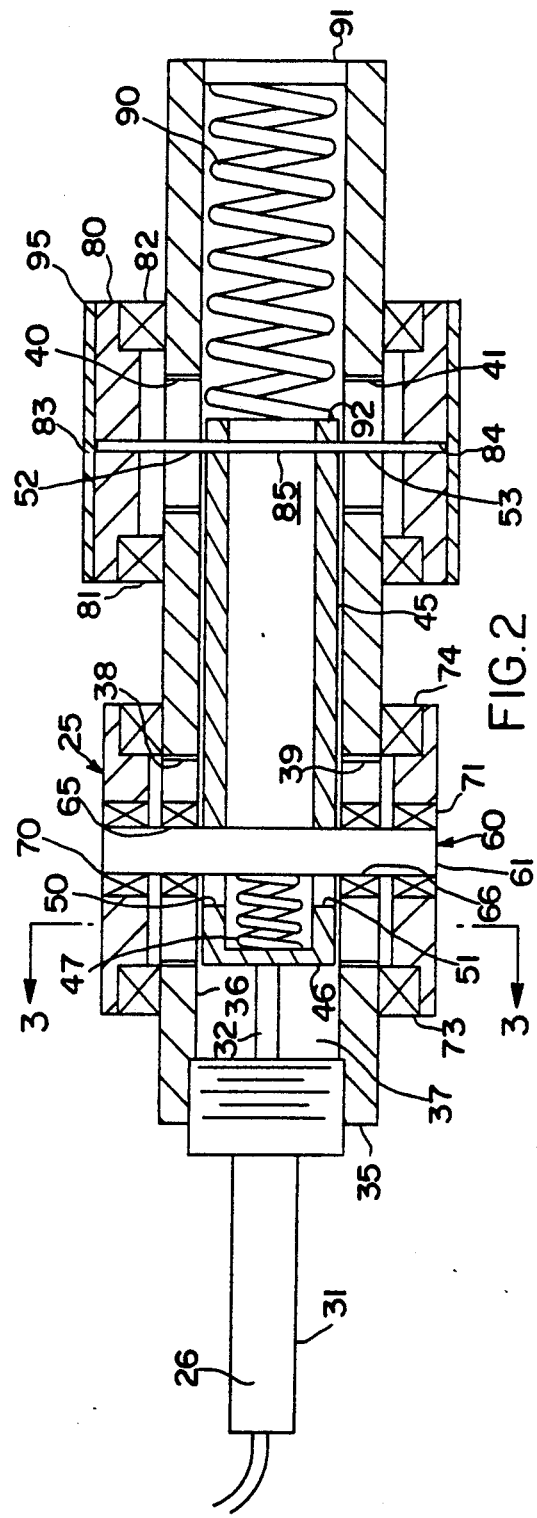
FIG.1
FIG.2

INTERMITTENTLY AND REVERSIBLY OPERABLE HOT WAX ENERGIZED HINGE

FIELD OF THE INVENTION

This invention relates to an actuator powered by expansion of a wax, and which is intermittently actuatable and reversible.

BACKGROUND OF THE INVENTION

The expansion of some waxes when they change from a solid to a fluid state when heated is known, and this property has been utilized to provide mechanical power to various mechanisms. When the wax cools sufficiently, it reverts to its solid state and its volume shrinks. It is evident that to keep a system in its actuated condition without additional devices such as retention latches, the wax must be kept hot, because reverse movement would result if the wax were permitted to cool. This is unacceptable for installations where available power is limited such as in spacecraft, and for this reason the use of these actuators has been limited to one-shot installations wherein the actuator's cooling is immaterial to subsequent system operation—it shrinks away from its actuated position, and the powered element generally remains locked in place without provision for its release and return.

But what if reversible and intermittent operation is desired instead? A second heating of hot wax simply would cause the hot wax to resume its previous expanded state, and nothing would be accomplished. No cycling operation would have occurred. The use of a second actuator to provide for a reverse movement is prohibitively expensive, and would add undesirable weight.

It is an object of this invention to provide a hot wax energized actuator which is capable of moving a mechanism to an actuated condition and leaving it there or nearly there after the wax has cooled and solidified, but thereafter, on a second heating of the wax, capable of enabling the mechanism to return to its original condition. Thus, two successive heatings of the wax can cause a mechanism to assume a first actuated (deployed) condition, and then a second unactuated (stowed) condition. Examples of such conditions are a hinged movement in opposite directions from a stowed to a deployed condition, and return.

The utility of a hot wax actuator for actuation purposes is thus extended to enable bi-directional operation with a single intermittently operated actuator, which can importantly reduce cost and weight by requiring only one individual hot wax element for many actuations, and to permit a mechanism to be retracted as well as deployed as the consequence of the expansion and contraction of the wax in a single hot wax actuator.

BRIEF DESCRIPTION OF THE INVENTION

A linearly-extensible hot wax energized actuator includes a body of wax which has a greater volume when hotter and liquefied than it has when it is cooler and solidified. The body of wax is enclosed in a body having a cylinder with a central axis, and a an actuator rod in sliding fluid sealing fit in the cylinder. The wax is placed in the cylinder. Heating means is provided to heat the wax in order to liquefy it. The wax will cool and solidify when the heating means is not energized.

When the wax is liquefied, it extends the plunger which in turn moves a mechanism to a first "actuated" or deployed position. A return spring is placed in this system which tends to return the mechanism to its second "unactuated" or stowed position.

A latch is interposed between the mechanism and a supporting mount, which will retain the mechanism at or near to its first position when the wax solidifies. It will hold the mechanism in its first position until released by a second energizing of the actuator, which will again heat the wax and liquefy it. Then, when the wax again solidifies, the return spring drives the mechanism back to its second position.

According to a preferred but optional feature of this invention, an over-ride mechanism is provided in the latch means which enables the mechanism to be latched precisely at its first position, rather than having to back off slightly from it when the wax solidifies.

This invention will be fully understood from the following detailed description and the accompanying drawings, in which:

BRIEF DESCRIPTION OF THE DRAWINGS

FIG. 1 is a top view of the presently-preferred embodiment of the invention;

FIG. 2 is an axial cross-section of a portion of FIG. 1;

DETAILED DESCRIPTION OF THE INVENTION

Figure 3:
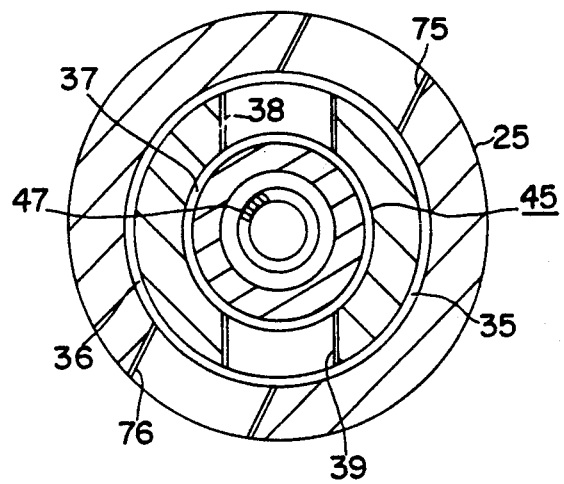
FIG. 3 is a cross-section taken at line 3—3 in FIG. 2.
Figure 4:
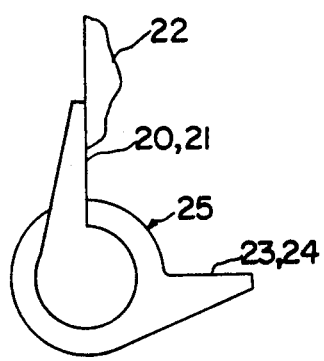
FIGS. 4, 5 and 6 are schematic showings of three orientations of portions of the device of FIG. 1.
Figure 5:
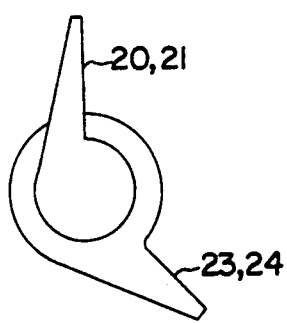
Figure 6:
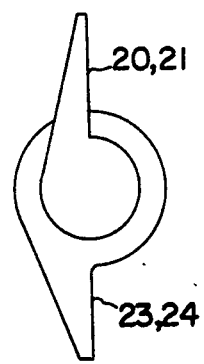

FIGS. 1 and 2 show a pair of stator hinge lugs 20, 21 which are mounted to fixed structure 22, such as a structural frame or support. Rotor hinge lugs 23, 24 are mounted to a hinge rotor 25 so as to rotate with the rotor around a central hinge axis 26. Next assemblies (not shown) such as solar panels are intended to be attached to the rotor hinge lugs. The function of this hinge assembly is to move the rotor hinge lugs to a first "deployed" position shown in FIG. 6, from a second "stowed" position shown in FIG. 4, FIG. 5 showing an intermediate position.

A hot wax actuator has a body 31 with an internal cavity (not shown) filled with wax and which includes a heater (not shown) to heat and liquefy the wax. An actuator rod 32 is moved axially as the consequence of liquefying and solidifying of the wax. Hot wax actuators are well-known and are commercially available.

Stator hinge lugs 20,21 are attached to, or integral with a hinge body 35. The wax is a solid when it is solidified. When solid, its volume is less than when it is in the liquid state. The change in state from solid to liquid powers the device to move the hinge lugs toward the first position. Actuator rod 32, in sealing contact with the wax is moved along axis 26 when the wax is heated or cooled.

Hinge body 35 is attached to structure 22. Body 35 has a passage wall 36 enclosing an axially extending passage 37. It includes a first pair of axially extending slots 38,39, and a second pair of axially extending slots 40,41. The slots of each pair are diametrically opposite from one another. Body 35 does not rotate.

A drive rod 45 fits in passage 37. It has a base 46 that is abutted by, but not connected to, actuator rod 32. Drive rod 45 is hollow except at its base. An over-ride spring 47 is seated in the drive rod, bearing against the base. A pair (third pair) of axially extending rotor follower slots 50,51 are formed in the wall of the drive rod. A pair of cross-ports 52,53 are also formed through the wall of the drive rod.

A hinge drive cam follower 60 has a shaft 61 which extends through slots 38 and 39 and through rotor follower slots 50 and 51. Bearings 65, 66 on shaft 61 fit in slots 38 and 39 respectively. Their diameter is equal to the width of the slots, and the slot is longer than this diameter.

The diameter of shaft 61 is about equal to the width of slots 50 and 51. Slots 50 and 51 are longer than the diameter.

Over-ride spring 47 bears against shaft 61 to bias it away from the base.

A pair of cam followers 70,71 are mounted to the ends of the shaft 61. They preferably are formed as bearings. Hinge rotor 25 is rotatably mounted to hinge body 35 by bearings 73,74.

A pair of hinge drive cam slots 75,76 are formed in the wall of hinge rotor 25. Cam followers 70,71 fit in these slots. The cam slots are 180 degrees apart, and are similarly directed. Shaft 61 cannot rotate around its axis, so that when it moves axially, depending on the slope of the cam slots, it can rotate hinge rotor 25. Cam slot 75 (FIG. 1) has oppositely facing slanted faces 77,78 and at its forward end, a straight segment 79 for a purpose yet to be described. Slot 76 is similarly formed.

Axial movement of the drive rod rotates the hinge rotor 25, except when the follower is in straight segment 79. The followers drive the rotor in opposite directions when bearing on faces 77 and 78.

A latch-out cam rotor 80 is rotatably mounted to the body by bearings 81,82. It has a pair of identical cam slots 83,84, 180 degrees apart. Only one need be provided, but it would then have to extend for a full 360 degrees which involves decreased slopes that might cause additional undesired friction losses. They are formed on the inside of cam rotor 80. A latch cam follower 85 is a very rigid and strong pin which passes through cross ports 52 and 53, projecting beyond them into cam slots 83,84. Its diameter is about equal to the width of slots 40 and 41, which are axially longer than the diameter of follower 85. Thus, it can move axially, but cannot rotate.

A return spring 90 is seated in end 91 of hinge body 35, and bears against end 92 of the drive rod. It will be compressed when the actuator is heated, and will tend to return the drive rod toward the actuator when it cools, unless prevented from doing so by latch means.

This prevention of return movement is the function of latch means 95 which forms part of the cam slot in cam rotor 80. At this point it is well to remember that the two rotors are separate from one another, and perform two different functions, although both of their functions are powered by axial movement of the drive rod. Shaft 61, which drives cam followers 70 and 71, causes rotation of hinge rotor 25.

Latch cam rotor 80 responds to axial movement of cam follower 85. Both shaft 61 and follower 85 do not rotate. They are held against rotation by the walls of the slots in which they fit. The function of cam follower 85, and of the cam slots 83 and 84 in which it fits (which will be described below) is only to latch the drive rod in an extended position after the first actuation of the actuator, and later to release it.

So that the deployed hinge can remain at its intended setting without withdrawing from its maximum excursion, the drive rod must move further by itself in order for latching to occur. The over-ride spring 47 and an excess length of slots 50 and 51 in the drive rod are provided for this purpose. When the actuator begins to push the drive rod, its rod bears against the base of the drive rod. This moves shaft 61 by pressing the base against the over-ride spring. This will move the shaft to the position shown in FIG. 2. At this time bearings 65 and 66 are midway in slots 38 and 39, and shaft 61 bears against the forward end of slots 50 and 51. This corresponds to the setting shown in FIG. 5.

Continuing movement of the drive rod finally presses bearings 65 and 66 against the ends of slots 38 and 39. This marks the limit of the forward travel of shaft 61, and corresponds to the setting of FIG. 6. However, the latching arrangement requires further travel of the drive rod, and this is accommodated by the over-ride spring, which enables this movement to occur despite the blockage of shaft 61 and continues to the end of its intended stroke.

When the actuator cools, the over-ride spring biases shaft 61 toward its farthest condition. Incidentally, at this time the followers 70 and 71 are in the straight portion 79 of the rotor cam slots, so as to resist rotary motion of the hinge without stressing the drive rod. The drive rod itself is held against rotation by means not yet to be described, and this will hold shaft 61 against retractive movement.

Figure 7:
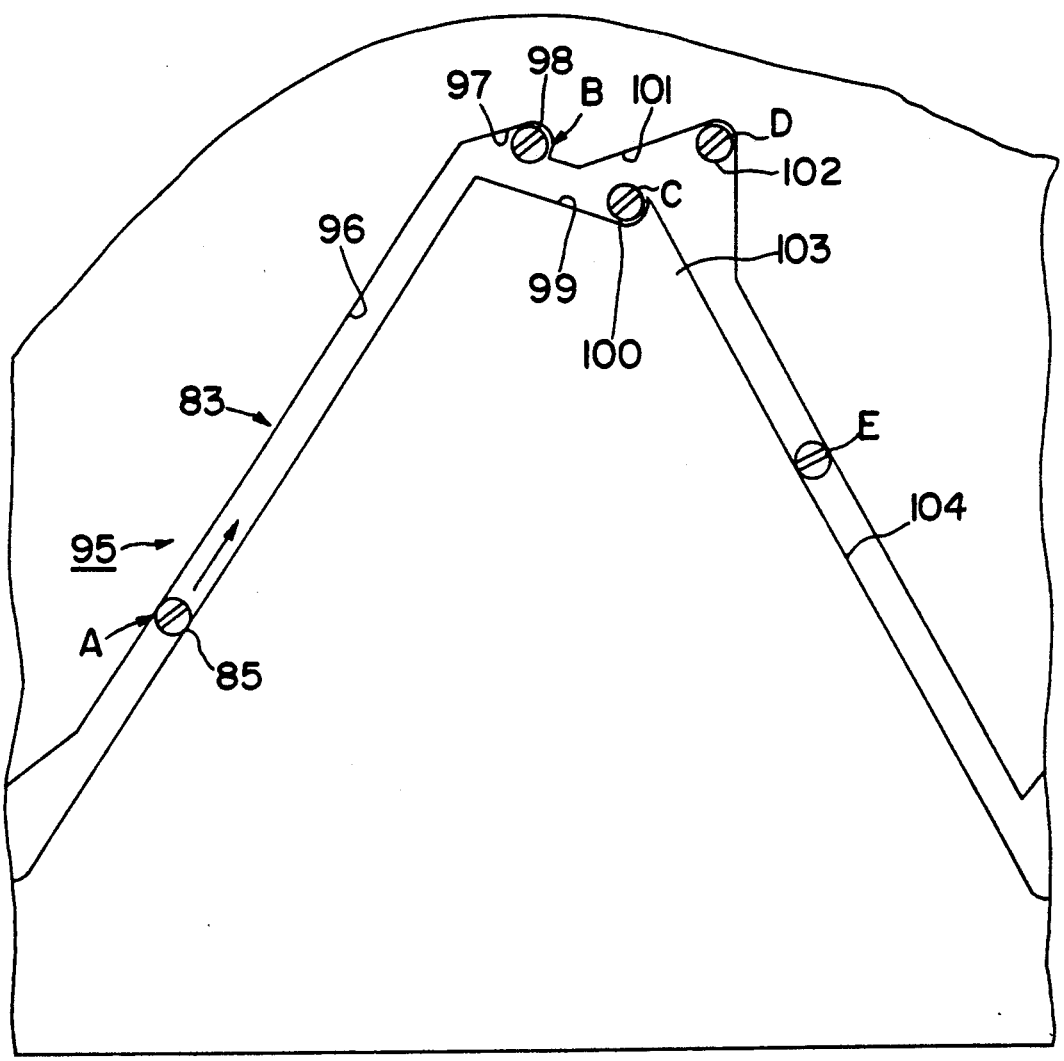
FIG. 7 is a cam layout showing a portion of the invention.

Cam slot 83 is shown in full detail in FIG. 7, where its construction is laid out flat in conventional cam design notation. Cam slots 83 and 84 are identical, and each extends for about 180 degrees so only slot 83 is described in detail.

A first slot segment 96 rises steeply, so as to cause least resistance to the movement of the drive rod as it starts the deployment of the hinge. A second segment 97 is more gradual, after which a stop 98 is formed on the upper face of the slot.

The follower 85 when rising (position A) will finally meet this stop (position b), which stops rotation of the cam, and also stops further advance of the drive rod. At or shortly before this event, heating current will be shut off, and the actuator can begin to cool. Limit switches will be provided for this purpose.

As the actuator cools, the follower will move axially in the return direction. The follower will approach and finally contact a transition segment 99 on the lower face of the slot. Transition segment 99 slopes down to a latch face 100, which traps follower 85 (position C), and also prevents further rotation of the cam. Now the follower 85, which is strongly held by the drive rod, latches the drive rod against retraction. The actuator can cool and retract away from the drive rod, but the drive rod will not retract, despite the bias force of the return spring, because follower 85 is firmly restrained, and actuator rod 32 not attached to base 46.

The system will remain in this first "deployed" condition so long as the actuator remains cooled. When retraction is desired, the actuator is again heated. The resulting axial movement of follower 85 causes it to engage an unlatching segment 101 on the upper face of the slot. This is a slanting segment, and this contact will cause the cam rotor to rotate until the follower engages a second stop 102 (position D). Further rotation of the cam rotor is prevented, and the drive rod can go no farther axially.

To continue the retraction, current to the actuator is cut off, and the actuator cools. As it does so, follower 85 moves downwardly to engage and slide along segments 103 and 104 (position E). The drive rod is released, and under the bias force from the return spring returns to the second, stowed, condition, and the hinge rotor will be rotated so as to return the hinge to its stowed condition.

The cam rotor will have completed a one-half revolution. In the next actuation, the latch cam follower will pass to the other slot. The slots are continuously connected. The cam rotor does not reverse its direction. The hinge rotor does reverse its direction.

It will now be appreciated that with a single actuator which can intermittently be heated and cooled, the hinge can be deployed and stowed. The resulting economy of cost and weight are evident.

This invention is not to be limited by the embodiment shown in the drawings and described in the description, which is given by way of example and not of limitations, but only in accordance with the scope of the appended claims.

I claim:

1. A powered hinge adapted reversibly and intermittently to be rotated between a first deployed condition and a second stowed condition, said hinge having a central axis of hinge rotation and comprising:

a hinge body having a peripheral wall and an internal axially-extending passage, said passage having a first end and a second end, first axially-extending slot means through said wall, and second axially-extending slot means through said wall axially spaced from said first slot means;

a drive rod slidably fitted in said passage, said drive rod having a base facing said first end of said passage, and a second end facing said second end of said passage, axially-extending third slot means through said drive rod, said third slot means having a width and an axial length and being axially aligned with said first slot means, and cross-port means aligned with said second slot means;

all of said slot means having a respective width and axial length;

a hinged drive cam follower shaft extending through said first and third slot means, projecting beyond the body, having an axial dimension about equal to their widths, and smaller than their lengths, whereby to be slidable, but not rotatable in either of them;

an over-ride spring compressively disposed between said base and said hinge drive cam follower shaft to bias said hinge drive cam follower shaft toward the second end of the drive rod;

a return spring compressively disposed between the second end of the drive rod and the second end of the body passage;

a latch cam follower in said cross port means passing through sad second slot means and projecting beyond the body, said latch cam follower having a dimension of width about equal to the width of the second slot means, and a dimension of length shorter than said second slot means, whereby to be slidable in said body, but not rotatable in said body or in said drive rod;

a hinge rotor rotatably mounted to said body and having a hinge cam track therein which is engaged by said hinge drive cam follower, said hinge cam track being so conformed that axial movement of the hinge drive cam follower can cause rotation of the hinge rotor;

a latch out cam rotor rotatably mounted to said body, said latch out cam rotor having a latch cam track engaged by said latch cam follower, so disposed and arranged as to have segments which result in unidirectional rotation of the latch cam rotor upon extension and retraction of said drive rod, and having a latch segment which will latch said latch cam follower to resist the bias of said return spring and thereby restrain the drive rod against movement toward the first end of the passage until released, thereby latching the hinge in the deployed condition; and hot wax actuator means including an actuator rod which bears against said base and forces the drive rod to move axially when heated and its wax liquefied to increase in volume and which when the wax is cooled and solidified to a lesser volume enables the return spring to return the drive rod.

2. A powered hinge according to claim 1 in which a pair of said hinge cam tracks are provided, each said track having oppositely facing faces in order to provide for bi-directional rotation of said hinge rotor.

3. A powered hinge according to claim 2 in which said hinge cam tracks have sloping segments for rotation of the hinge rotor and an axially-extending segment at its end respective to the deployed condition in which rotation of the hinge rotor is prevented by said axially-extending segment.

4. A powered hinge according to claim 1 in which the hinge drive cam follower shaft engages the ends of the first and third slot means before said over-ride spring is fully compressed thereby enabling further axial movement of the drive rod to continue to rotate the latch out cam rotor while the hinge rotor remains stationary.

5. A powered hinge according to claim 1 in which said latch cam track includes opposite faces, one segment slanting to cause rotation of said latch out cam rotor while the drive rod is being driven by the actuator, a stop engageable by the latch cam follower at the farthest intended excursion thereof, a transition segment axially aligned with the stop, a latch face contiguous to the transition segment, and axially and angularly spaced from said stop, said latch cam follower engaging and being held by said latch face while the actuator remains deenergized, an unlatching segment axially aligned with the latch face engageable by the latch cam follower when the drive rod is again driven by the actuator which traps the latch cam follower until the drive rod again retracts, and a return segment slanting to rotate the latch cam rotor to a position corresponding to the stowed condition.

6. A powered hinge according to claim 5 in which a pair of said latch cam tracks are provided, 180 degrees apart, and in which they are interconnected to enable unidirectional rotation of the latch cam rotor through an indefinite number of cycles.

7. A powered hinge according to claim 5 in which the hinge drive cam follower shaft engages the ends of the first and third slot means before said over-ride spring is fully compressed thereby enabling further axial movement of the drive rod to continue to rotate the latch out cam rotor while the hinge rotor remains stationary.

8. A powered hinge according to claim 7 in which a pair of said hinge cam tracks are provided, each said track having oppositely facing faces in order to provide for bi-directional rotation of said hinge rotor.

9. A powered hinge according to claim 8 in which said hinge cam tracks have sloping segments for rotation of the hinge rotor and an axially-extending segment at its end respective to the deployed condition in which rotation of the hinge rotor is prevented by said axially-extending segment.

* * * * *